United States Patent [19]

Togashi

[11] Patent Number: 5,248,155
[45] Date of Patent: Sep. 28, 1993

[54] CONTAINER HOLDER
[75] Inventor: Yasuo Togashi, Ishigawa, Japan
[73] Assignee: Shibuya Kogyo Co., Ltd., Ishikawa, Japan
[21] Appl. No.: 835,131
[22] Filed: Feb. 12, 1992
[30] Foreign Application Priority Data
  Feb. 27, 1991 [JP] Japan .................................. 3-55837
[51] Int. Cl.⁵ ..................... B65B 43/46; B23B 31/30
[52] U.S. Cl. ............................... 279/4.11; 141/165; 141/177; 141/378; 269/25; 279/110
[58] Field of Search ............... 141/152, 165, 177, 312, 141/375, 376, 378; 269/25, 104, 118; 279/4.11, 110, 112-123

[56] References Cited
U.S. PATENT DOCUMENTS

| 4,124,112 | 11/1978 | Mohney et al. | 198/344 |
| 4,159,762 | 7/1979 | Bulwith | 198/472 |
| 4,669,161 | 6/1987 | Sekelsky, Jr. | 269/25 X |
| 4,698,475 | 10/1987 | Lothenbach et al. | 219/69 W |
| 4,787,505 | 11/1988 | Tweedy | 198/803.01 |
| 4,844,237 | 7/1989 | Petersen | 198/803.01 |
| 4,911,212 | 3/1990 | Burton | 141/378 X |
| 5,060,781 | 10/1991 | Santandrea et al. | 198/345.1 |

FOREIGN PATENT DOCUMENTS 2552735  4/1985  France .

Primary Examiner—Steven C. Bishop
Attorney, Agent, or Firm—Flynn, Thiel, Boutell & Tanis

[57] ABSTRACT

A container holder which can be used with a variety of containers when positioning them in a container processing step is disclosed. Pairs of container holding members are disposed within a holder body which receives a container. One pair of holding members are disposed opposite to each other on one of orthogonal lines defined within a holder body. The holding members are urged from the outside to be movable toward the center, and are also retractable toward the outside of the holder body. All of the container holding members are once returned to a start position (where they have been retracted to their full extent), and are then driven to advance to a position where they conform to a container model which is inserted centrally within the holder body.

9 Claims, 5 Drawing Sheets

CONTAINER HOLDER

FIELD OF THE INVENTION

The invention relates to a container holder as may be used in a variety of container processing steps such as a filling operation or a capping operation, and in particular, to a container holder which is commonly referred to as "skirt", which is used to hold a container by a fitting engagement with a container in order to position such containers.

Background of the Invention

In a variety of processing operations such as a filling or a capping operation to be applied to containers having a varied cross sectional configuration such as an elliptical cross section, the orientation or centering of containers has been conducted by fitting containers in a container holder as mentioned above before they are placed on a processing line.

However, such a container holder is generally formed as a body molded from a resin which is provided with a receiving opening conforming to the configuration of a specific container. Accordingly, a particular holder cannot be used with containers of a different kind. If a plurality of container receiving openings are formed in the body in a manner such that cross-sectional configurations of different containers cross each other, in actual practice, a single holder can be used with at most two kinds of containers.

Where many varieties of containers are to be treated, a number of container holders must be manufactured if the prior practice is followed. In addition, a number of difficulties have been experienced with a space for storage of the holders and their placement onto a processing line.

SUMMARY OF THE INVENTION

Accordingly, it is an object of the invention to provide a container holder which can be used with a variety of containers in common.

The above object is accomplished in accordance with the invention by the provision of a holder body which receives a container, four container holding members disposed within the holder body, one pair being oppositely disposed on one of orthogonal lines, advance means for advancing each container holding member toward the center of the holder body, stop means for stopping the container holding member as it has been advanced to a given position, and retraction means for retracting the container holding member toward the outside of the holder body.

DESCRIPTION OF EMBODIMENTS

Figure 1:
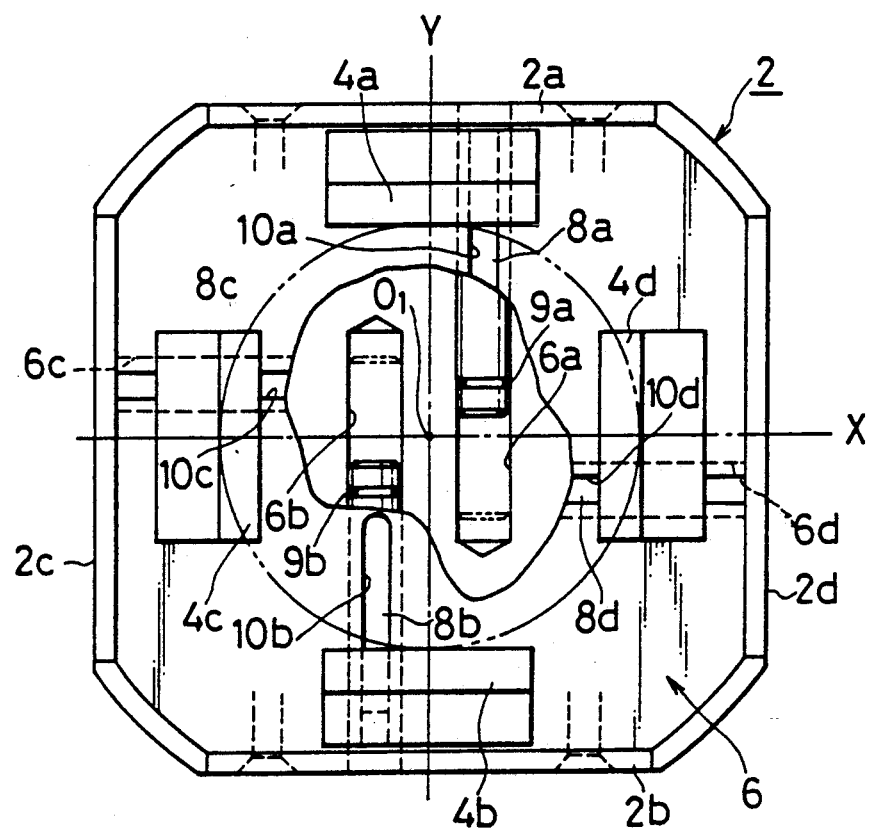
FIG. 1 is a plan view of a container holder according to one embodiment of the invention.

Several embodiments of the invention will now be described with reference to the drawings. Disposed in a tubular casing (holder body) 2 having a rectangular cross section and having a closed bottom are four container holding members 4a, 4b, 4c and 4d in a reciprocable manner.

The casing 2 is substantially in the form of a square in section, and the four corners are cut off and replaced by arcs of a circle to present generally a substantially octagonal configuration. A container receptacle 6, having openings to be fitted by a pin cylinder to be described later, an air passage or the like, is placed on and secured to the bottom. In its upper portion, the receptacle 6 is formed with a pair of cylinder openings 6a, 6b which are disposed on the opposite sides of a bisector line Y, passing through the center $O_1$ of the container holder and dividing the interior of the holder into two equal portions, and which extend from opposite or upper and lower sidewalls 2a, 2b of the casing toward and beyond the center in parallel relationship with the line Y. At a location below the cylinder openings 6a, 6b, a pair of cylinder openings 6c, 6d are disposed on the opposite sides of a line X which is perpendicular to the line Y and extend from the opposite lateral sidewalls 2c, 2d of the casing toward and beyond the center of the casing in parallel relationship with the line X. Each of the four cylinder openings 6a, 6b, 6c and 6d extend beyond the center of the container receptacle 6, but each opposing pair runs parallel to each line X or Y on opposite sides thereof, and one pair is located at a different elevation from the other pair, so that they cannot intercept with each other within the receptacle. Pin cylinders 8a, 8b, 8c and 8d are slidably fitted in the cylinder openings 6a, 6b, 6c and 6d, respectively. The container holding members 4a, 4b, 4c and 4d are fixedly mounted on the respective pin cylinders 8a, 8b, 8c and 8d, respectively. Elongate slots 10a, 10b, 10c and 10d are formed in the receptacle 6 at respective locations above the associated cylinder openings 6a, 6b, 6c and 6d, respectively, and extend to the upper surface of the receptacle 6, whereby the container holding members 4a, 4b, 4c and 4d are reciprocable with the pin cylinders 8a, 8b, 8c and 8d, respectively, within an extent defined by these elongate slots 10a, 10b, 10c and 10d, respectively. O-rings 9a, 9b, 9c and 9d are fitted over the free end of the pin cylinders, 8a, 8b, 8c and 8d, respectively, and their friction is effective to prevent a movement of the associated pin cylinder when the latter is inoperative.

A recess 2e is centrally formed in the upper surface of the bottom of the casing 2, and the container receptacle 6 is formed with air passages 12a, 12b, 12c and 12d (12a and 12b being not shown) which provide a communication between the recess 2e and the inner tip end of the respective cylinder openings 6a, 6b, 6c and 6d. The bottom of the casing 2 is formed with a supply port 2f through which the air is introduced into the recess 2e from the outside.

Figure 2:
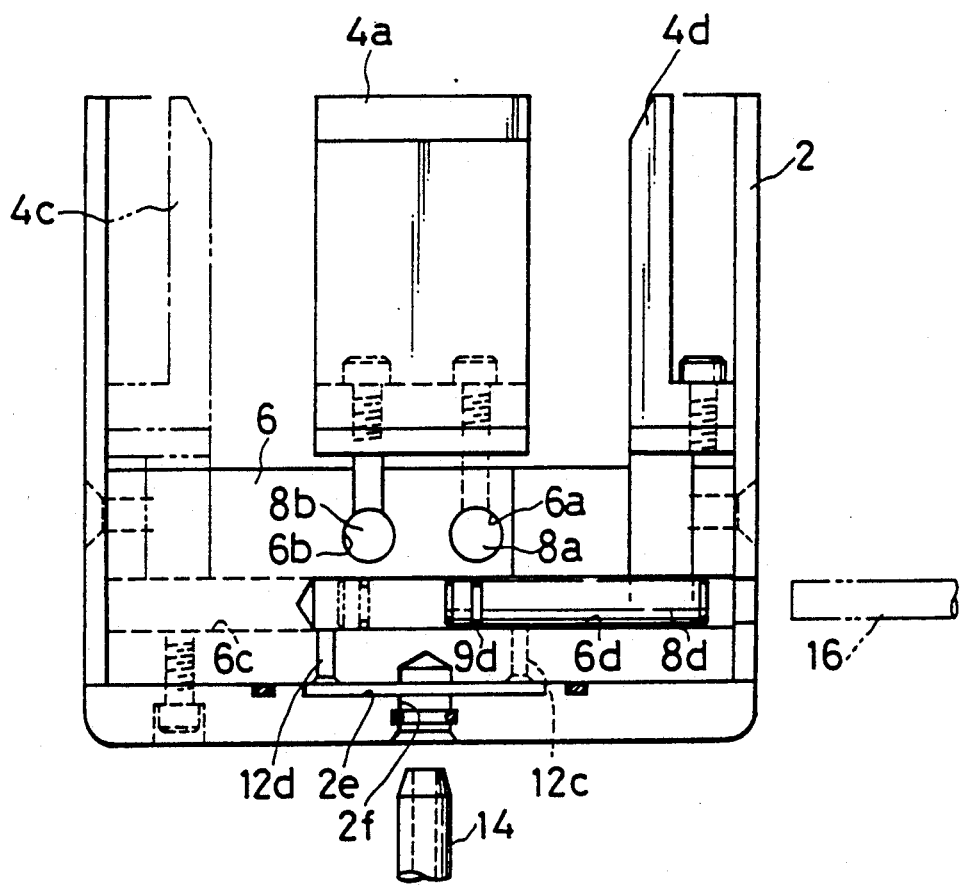
FIG. 2 is a longitudinal section of the container holder.

A remodelling of the container holder, namely, an adjustment to be made to cause the holder to adapt to a different container configuration, will now be described. At a home station on a line on which the container holder is conveyed, an air coupler 14 (see FIG. 2) is inserted into the air supply port 2f in the bottom surface of the casing 2, and the air pressure is utilized to cause the pin cylinders 8a, 8b, 8c and 8d to be returned to their start position within the associated cylinder openings 6a, 6b, 6c and 6d (in the present embodiment, the position where each of the container holding members 4a, 4b, 4c and 4d retracts to their full extent to abut against the inner surface of the sidewalls 2a, 2b, 2c and 2d of the casing 2). Subsequently, at a remodelling station of the conveying line, container model or remodelling jig is inserted inside the four container holding members 4a, 4b, 4c and 4d, and four remodelling push pins 16 are inserted into the respective cylinder openings 6a, 6b, 6c and 6d, and the pin cylinders 8a, 8b, 8c and 8d are driven inward until the associated container holding members 4a, 4b, 4c and 4d move into abutment against the respective container models.

Such movement of the container holding members 4a, 4b, 4c and 4d in conformity to the container model allows a container of any configuration to be held in a stable manner within the space defined by the four container holding members.

Figure 3:
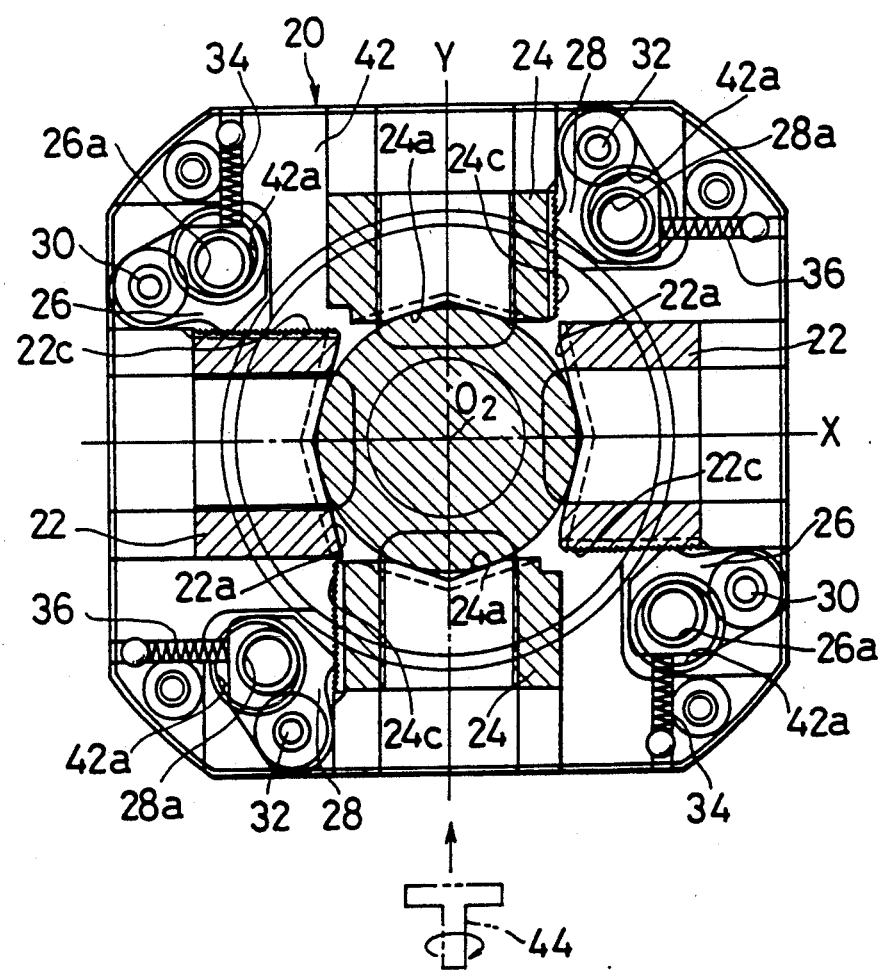
FIG. 3 is a plan view of a container holder according to a second embodiment of the invention.
Figure 4:
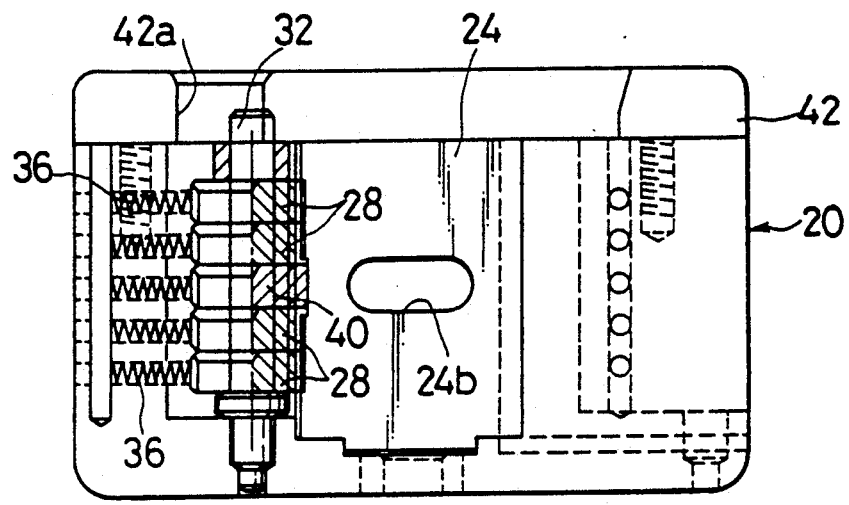
FIG. 4 is a side elevation, partly in section, of the container holder of the second embodiment.
Figure 5:
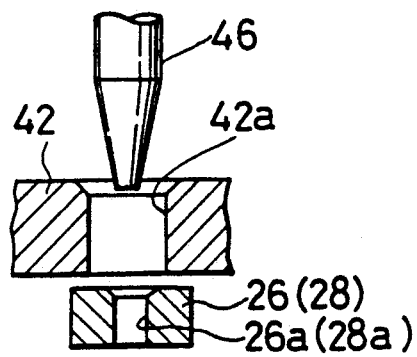
FIG. 5 is an illustration of disengaging a ratchet.

Referring to FIGS. 3 to 5, a second embodiment of the invention will now be described. In this instance, a container holder comprises a holder body 20, and two pairs of fingers or container holding members 22, 24, the fingers of each pair being disposed in opposing relationship to each other on one the of orthogonal lines X or Y which passes through the center $O_2$ of the holder body 20. Each finger 22 or 24 is reciprocable on the associated line X or Y, and the opposing surfaces are formed with V-shaped recesses 22a, 24a. The rear surface of each finger 22, 24 is formed with a slot 22b or 24b (22b being not shown) (see FIG. 4) which receives a transversely elongate T-shaped jig 44 (see FIG. 3).

One lateral surface of each finger 22, 24 is formed with a number of teeth 22c, 24c, and ratchets 26, 28 are disposed laterally adjacent to the finger teeth 22c, 24c for meshing engagement with their teeth. Each ratchet 26, 28 is rotatable about a fulcrum pin 30, 32, but is urged by an associated spring 34 or 36 which engages their rear surface into meshing engagement with the associated finger teeth 22c or 24c. In the present embodiment, the meshing engagement between the finger teeth 22c, 24c and the ratchet 26, 28 prevents a movement of the finger teeth 22c, 24c toward the center of the holder 20, but the tooth configuration may be modified to provide a stop in either direction. As shown in FIG. 4, the ratchet 26, 28 comprises a plurality of divided sections for the purpose of assuring a meshing engagement of teeth in any one of these sections with the finger teeth 22c, 24c as a result of slight differences in the sizes of the individual sections. Anti-rattling brakes 38, 40 (38 being not shown) are disposed intermediate the upper two and the lower two sections of the ratchets 26, 28, but may be dispensed with under certain instances.

A top cover 42 is secured around the outer periphery of the holder body 20, and is formed with four circular holes 42a at locations directly above the ratchet 26, 28. On the other hand, the ratchets 26, 28 are formed with circular holes 26a, 28a of a reduced diameter at a position which is eccentric from the circular hole 42a when the ratchets are urged by the springs 34, 36 into meshing engagement with the finger teeth 22c, 24c.

In operation, T-shaped jig 44 (see FIG. 3) is inserted through the transversely elongate slot 22b, 24b formed in the rear surface of each finger 22, 24 at the home station, and then is rotated to engage it with the inner surface of the opening 22b, 24b to allow the fingers 22, 24 to be pulled to return them to their start position (where the fingers 22, 24 have retracted through its full extent).

At a remodelling station, a pin 46 having a tapered tip (see FIG. 5) is inserted through the circular hole 42a in the top cover 42 and the hole 26a or 28a of a smaller diameter of either ratchet 26 or 28 which is disposed eccentric with respect to the circular hole 42a to disengage the ratchet 26 or 28 from the teeth 22c or 24c. Under this condition, a container model is disposed into the central portion of the holder body 20, and subsequently the fingers 22, 24 are driven toward the center until they contact the container model.

Figure 6:
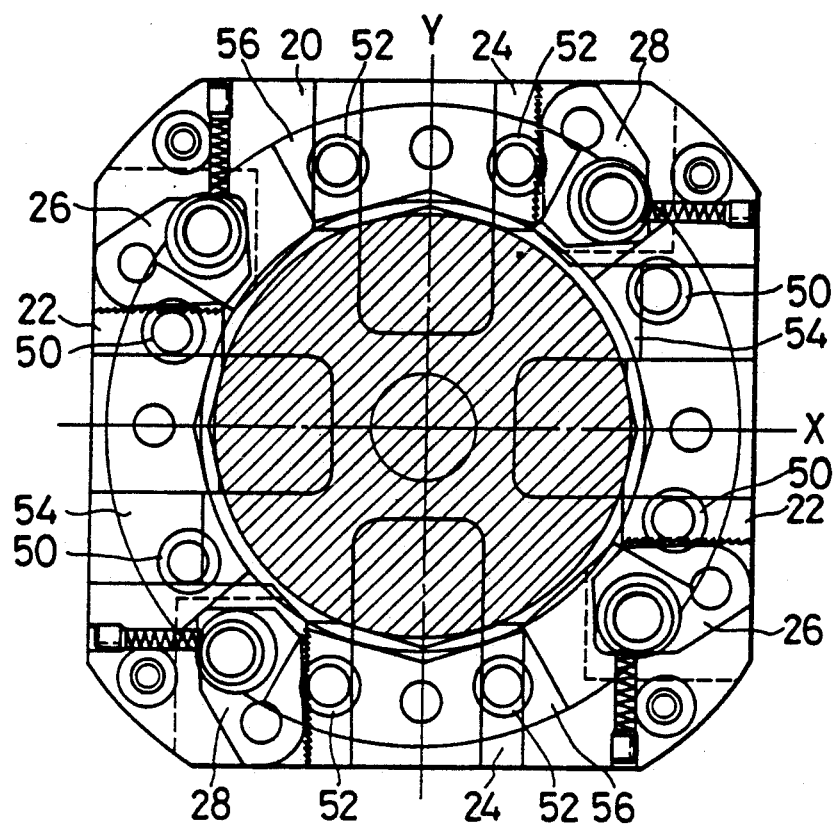
FIG. 6 is a plan view of a container holder according to a third embodiment of the invention.
Figure 7:
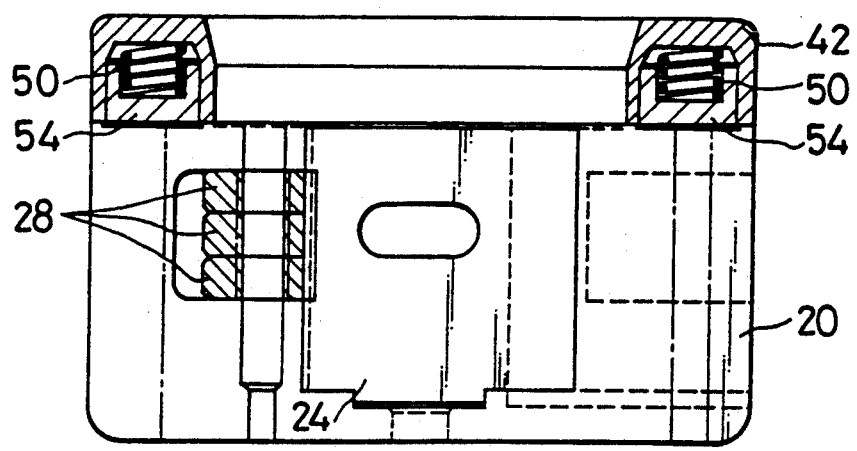
FIG. 7 is a side elevation, partly in section, of the container holder of the third embodiment.

FIGS. 6 and 7 show a third embodiment of the invention. This embodiment includes fingers 22, 24 and ratchets 26, 28 which serve as stops for the fingers 22, 24, all of which are similar to those of the previous embodiment. In addition, this embodiment includes a mechanism for preventing any movement of the fingers 22, 24 upon impact. Specifically, the top cover 42 houses springs 50, 52 at locations directly above the respective fingers 22, 24 and these springs act to urge the associated fingers 22, 24 against the bottom surface of the holder body 20 through abutments 54, 56. A remodelling operation of this embodiment takes place in the similar manner as in the second embodiment.

While the invention has been disclosed above in connection with several embodiments thereof, it should be understood that the above disclosure is illustrative only, but that a number of changes, modifications and substitutions therein will readily occur to one skilled in the art from the above disclosure without departing from the spirit and scope of the invention defined by the appended claims.

What is claimed is:

1. A container holder, comprising:
   a holder body for receiving a container;
   a plurality of container holding members which are reciprocably guided by guide means mounted on said holder body to and from a center of the holder body;
   advance means separate from said holder body for advancing the individual container holding members toward the center of the holder body;
   retraction means separate from said holder body and separate from said advancing means for retracting the container holding members toward the outside of the holder body; and
   stop means separate from said advancing means and said retraction means and being mounted on said holder body for stopping and holding the individual container holding members at given positions.

2. A container holder according to claim 1, wherein plural pairs of container holding members are provided, each pair of container holding members being disposed in opposing relationship with each other on an orthogonal line within the holder body.

3. A container holder, comprising:
   a holder body for receiving a container;
   a plurality of container holding members which are reciprocably guided by guide means to and from a center of the holder body;
   advance means for advancing the individual container holding members toward the center of the holder body;
   retraction means for retracting the container holding members toward the outside of the holder body; and stop means for stopping and holding the individual container holding members at given positions, said container holding members each being mounted on a pin which is slidably fitted in an opening in said container holder, each said pin being stopped at a given position due to the friction of an O-ring which is fitted on each said pin.

4. A container holder according to claim 3, wherein the pin is retracted under the influence of air which is introduced into the opening in which the pin is fitted.

5. A container holder, comprising:
a holder body for receiving a container;
a plurality of container holding members which are reciprocably guided by guide means to and from a center of the holder body;
advance means for advancing the individual container holding members toward the center of the holder body;
retraction means for retracting the container holding members toward the outside of the holder body; and
stop means for stopping and holding the individual container holding members at given positions, each container holding member being formed with laterally projecting teeth, said teeth being in meshing engagement with a ratchet to thereby effectively stop and hold said container holding member at a given position.

6. A container holder according to claim 5, wherein the ratchet includes a plurality of vertically offset sections having slightly different sizes.

7. A container holder according to claim 5, wherein the ratchet is rotatable about a fulcrum, and is urged by a spring into meshing engagement with teeth formed on the container holding member.

8. A container holder according to claim 5, wherein the ratchet and the holder body are formed with openings which are eccentric with respect to each other, a tapered pin being inserted into these openings to disengage the teeth on the container holding member from the meshing engagement with the ratchet.

9. A container holder according to claim 5, wherein the container holding member is urged by a spring against the bottom surface of the holder body to prevent any movement thereof upon impact.

* * * * *

UNITED STATES PATENT AND TRADEMARK OFFICE
CERTIFICATE OF CORRECTION

PATENT NO. : 5,248,155
DATED : September 28, 1993
INVENTOR(S) : Yasuo TOGASHI

It is certified that error appears in the above-identified patent and that said Letters Patent is hereby corrected as shown below:

On the title page, item [75], change inventor's residence from "Ishigawa, Japan" to ---Ishikawa, Japan---.

Signed and Sealed this

Third Day of May, 1994

Attest:

BRUCE LEHMAN

Attesting Officer

Commissioner of Patents and Trademarks